(12) United States Patent
Kinugawa et al.

(10) Patent No.: US 9,316,310 B2
(45) Date of Patent: Apr. 19, 2016

(54) WORKING MACHINE

(75) Inventors: Ryosuke Kinugawa, Sakai (JP); Keisuke Miura, Sakai (JP); Isao Tanaka, Sakai (JP); Kazuyoshi Arii, Sakai (JP); Yuji Fukuda, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 686 days.

(21) Appl. No.: 13/570,490

(22) Filed: Aug. 9, 2012

(65) Prior Publication Data

US 2013/0036729 A1 Feb. 14, 2013

(30) Foreign Application Priority Data

Aug. 10, 2011 (JP) ................ P2011-174991
Aug. 10, 2011 (JP) ................ P2011-174992
Aug. 10, 2011 (JP) ................ P2011-174993

(51) Int. Cl.
*F16H 61/421* (2010.01)
*F16H 61/468* (2010.01)

(52) U.S. Cl.
CPC ............ *F16H 61/421* (2013.01); *F16H 61/468* (2013.01); *B60Y 2200/411* (2013.01)

(58) Field of Classification Search
CPC ... F16H 61/433; F16H 61/421; F16H 61/468; B60Y 2200/411
USPC ............ 60/431, 433, 443, 444, 449, 472, 487
See application file for complete search history.

(56) References Cited

U.S. PATENT DOCUMENTS

| | | | | |
|---|---|---|---|---|
| 5,390,759 | A * | 2/1995 | Gollner | F16H 61/421 180/307 |
| 2007/0101708 | A1* | 5/2007 | Ohigashi et al. | 60/431 |
| 2010/0009806 | A1* | 1/2010 | Shirao et al. | 477/52 |
| 2010/0235066 | A1* | 9/2010 | Hill | 701/102 |
| 2010/0236233 | A1* | 9/2010 | Sumiyoshi | E02F 9/2232 60/445 |
| 2011/0264335 | A1* | 10/2011 | Zhao et al. | 701/50 |

FOREIGN PATENT DOCUMENTS

| | | | |
|---|---|---|---|
| JP | 2010-270527 A | 12/2010 | |
| JP | 2010-270528 A | 12/2010 | |

* cited by examiner

*Primary Examiner* — Nathaniel Wiehe
*Assistant Examiner* — Dustin T Nguyen
(74) *Attorney, Agent, or Firm* — Birch, Stewart, Kolasch & Birch, LLP

(57) ABSTRACT

A pressure control valve for controlling a travel primary side pressure that is a pressure of a primary side of a travel operation device is controlled by a control unit, thus the travel primary side pressure is controlled, and thereby a traveling speed is intended to be increased, preventing an engine stall.

4 Claims, 6 Drawing Sheets

WORKING MACHINE

TECHNICAL FIELD

The present invention relates to a self-propelled working machine such as a Compact Track Loader (CTL), a Skid Loader, and a Backhoe.

BACKGROUND ART

There are track loaders described in Japanese Unexamined Patent Publications JP-A 2010-270527 and JP-A 2010-270528 as a self-propelled working machine.

The track loader has a HST (Hydro Static Transmission) including: a HST pump composed of a tilted-plate type variable capacity pump driven by an engine; and a HST motor for driving a travelling device driven by a discharge oil from the HST pump, the HST motor being connected to the HST pump to be in a closed circuit with use of a pair of gear-changing oil passages.

In addition, the track loader has a main pump and a pilot pump each driven by the engine, and has: a working device driven by a discharge oil of the main pump; and a travel operation device for controlling a tilted plate of the HST pump due to a discharge oil of the pilot pump.

The working device has: an arm operated to be swung upward and downward; and a bucket attached to a leading end side of the arm.

As for the track loader, in a case where a load is applied to the HST motor such as in a case where the bucket is thrust into, for example, earth and sand by moving the track loader forward, the load applied to the HST motor is transmitted via the HST pump to the engine, and accordingly an engine speed is dropped.

On this occasion, when the bucket is operated to shovel at the same moment and thus a high load is applied to the bucket, the load acted from the bucket on the main pump may be transmitted to the engine to stall the engine, and accordingly in the conventional track loader, in order to prevent the engine from stalling, a bleed circuit for draining a part of the pilot oil supplied from the pilot pump to the travel operation device via a throttling is provided.

Due to the provision of the bleed circuit, when the engine speed is dropped, the number of rotations of the pilot pump is decreased to decrease a discharge amount of the pilot pump, and a ratio of an oil leak from the bleed circuit with respect to the discharge amount of the pilot pump becomes large. And accordingly, a primary side pressure of the travel operation device (that is referred to as a travel primary side pressure) decreases, a pilot pressure outputted from the travel operation device decreases in accordance with the dropping of the engine speed, and thereby a tilted-plate angle of the HST pump is automatically adjusted so as to reduce the rotation number of the pump (so that the tilted plate can return to a neutral side) to decrease the load of the engine, thus preventing the engine from stalling.

SUMMARY OF INVENTION

Technical Problem

As for the conventional track loader, in a hill-climbing operation under a state where a movable load of the bucket is excessive, there are problems that a dropping amount of the engine speed is large and that a hill-climbing speed is low.

To deal with the problems, it can be considered to rapidly decrease the travel primary side pressure upon dropping of the engine speed. When the engine speed drops, the travel primary side pressure is rapidly decreased, and thereby the load acted upon the engine from the HST pump side is decreased early to be balanced at a relatively-high real engine speed (an actual engine speed). The speeding-up due to a flow increase of the HST pump caused by the engine speed is larger than the speeding-down due to a flow decrease of the HST pump caused by reduction of the tilted-plate angle, and accordingly when the balancing is realized at the relatively-high real engine speed, a traveling speed can be totally increased.

However, in the conventional track loader, since only the travel primary side pressure is released by the bleed circuit, a characteristic line between the engine speed and the travel primary side pressure cannot be generated relatively freely. Accordingly, a characteristic line that upon applying of a predefined load or more, rapidly decreases the travel primary side pressure, setting the travel primary side pressure under a no-load state to be to some extent high cannot be generated freely.

In addition, for example, even in the working under a condition where a target engine speed is set to the maximum speed, when the bucket is thrust into, for example, the piled earth and sand by moving the track loader forward, the real engine speed is dropped to around 1200 rpm; however, when a decreasing amount of the travel primary side pressure is large with respect to the dropping amount under the condition where the real engine speed is dropped to the speed, torque of the engine runs short, and accordingly the engine speed is recovered slowly. For this reason, in a case where the track loader tries to move backward after the bucket is thrust into, for example, the piled earth and sand, when the real engine speed is low and also the travel primary side pressure is low, there is a problem that: the engine speed is hard to be recovered and thus the track loader cannot move backward smoothly.

The number of the target engine speeds determined by an acceleration operating member is countless. Thus, the conventional track loader cannot generate the characteristic line that upon applying of a predefined load or more, rapidly decreases the travel primary side pressure for each of the target engine speeds determined by the acceleration operating member.

Accordingly, the present invention intends to solve the above-mentioned problems by: controlling, with use of a control unit, a pressure control valve for controlling the travel primary side pressure that is a pressure of a primary side of a travel operation device; and thus controlling the travel primary side pressure.

Solution to Problem

Technical means provided to solve the above-mentioned technical problems by the present invention are characterized in points described below.

According to a first aspect of the present invention, an HST pump composed of a tilted-plate type variable capacity pump driven by an engine; and an HST motor for driving a travelling device driven by a discharge oil from the HST pump, the HST motor being connected to the HST pump to be in a closed circuit with use of a pair of gear-changing oil passages; a pilot pump driven by the engine; a travel operation device for controlling a tilted plate of the HST pump due to a pilot oil discharged by the pilot pump; a pressure control valve for controlling a travel primary side pressure that is a pressure of a primary side of the travel operation device; and a control unit for controlling the pressure control valve are comprised, and a no-load characteristic line showing a relationship between the travel primary side pressure and a real engine speed under a condition where the engine is unloaded; and a drop characteristic line showing a relationship between the travel primary side pressure and the real engine speed under a condition where a predefined load or more is applied to the engine are generated by the control unit controlling the pressure control valve.

According to the first aspect of the present invention, since the pressure control valve for controlling the travel primary side pressure and the control unit for controlling the pressure control valve are provided, the no-load characteristic line under a condition where the engine is unloaded and the drop characteristic line under a condition where the predefined or more load is applied to the engine can be independently generated, thus the characteristic line under the condition where the engine is unloaded and the characteristic line under the condition where the predefined or more load is applied to the engine can be independently generated adequately, and accordingly the working machine intending to increase a traveling speed with the engine stall prevented can be provided.

According to a second aspect of the present invention, an HST pump composed of a tilted-plate type variable capacity pump driven by an engine; an HST motor for driving a travelling device driven by a discharge oil from the HST pump, the HST motor being connected to the HST pump to be in a closed circuit with use of a pair of gear-changing oil passages; a pilot pump driven by the engine; a travel operation device for controlling a tilted plate of the HST pump due to a pilot oil discharged by the pilot pump; a pressure control valve for controlling a travel primary side pressure that is a pressure of a primary side of the travel operation device; and a control unit for controlling the pressure control valve are comprised, and a drop characteristic line showing a relationship between the travel primary side pressure and the real engine speed under a condition where a predefined load or more is applied to the engine is generated by the control unit controlling the pressure control valve, and the drop characteristic line is bent in a middle portion and includes: a first characteristic line portion set so that the travel primary side pressure is rapidly decreased as the real engine speed can be dropped from a target engine speed; and a secondary characteristic line portion set so that the travel primary side pressure can be decreased slowly in comparison with the first characteristic line portion as the real engine speed is dropped, in a case where the engine speed is further dropped.

According to the second aspect of the present invention, due to the first characteristic line portion set so that the travel primary side pressure can be rapidly decreased, the engine stall can be prevented and the traveling speed can be increased in the case where the load is applied, and due to the second characteristic line portion set so that the travel primary side pressure can be decreased slowly in comparison with the first characteristic line portion, an effect that easily recovers the engine speed after widely dropping due to the applying of an excessive load can be obtained.

According to a third aspect of the present invention, an HST pump composed of a tilted-plate type variable capacity pump driven by an engine; an HST motor for driving a travelling device driven by a discharge oil from the HST pump, the HST motor being connected to the HST pump to be in a closed circuit with use of a pair of gear-changing oil passages; a pilot pump driven by the engine; a travel operation device for controlling a tilted plate of the HST pump due to a pilot oil discharged by the pilot pump; a pressure control valve for controlling a travel primary side pressure that is a pressure of a primary side of the travel operation device; a control unit for controlling the pressure control valve; and an acceleration operating member for increasing and dropping a target engine speed are comprised, and by the control unit controlling the pressure control valve, a drop characteristic line showing a relationship between the travel primary side pressure and the real engine speed under a condition where a predefined load or more is applied to the engine is generated, and the drop characteristic line is generated for each of the target engine speeds determined by the acceleration operating member.

According to the third aspect of the present invention, since the pressure control valve for controlling the travel primary side pressure and the control unit for controlling the pressure control valve are provided, the characteristic line rapidly decreasing the travel primary side pressure at the applying of the predefined or more load can be generated for each of the target engine speeds determined by the accelerator operating member, thus the increasing of the traveling speed can be realized on purpose with the engine stall prevented, and accordingly improvement of the working machine performance can be intended.

According to a fourth aspect of the present invention, in the first aspect of the present invention, the drop characteristic line is bent in a middle portion and includes: a first characteristic line portion set so that the travel primary side pressure is rapidly decreased as the real engine speed can be dropped from a target engine speed; and a secondary characteristic line portion set so that the travel primary side pressure can be decreased slowly in comparison with the first characteristic line portion as the real engine speed is dropped, in a case where the engine speed is further dropped.

According to the fourth aspect of the present invention, due to the first characteristic line portion set so that the travel primary side pressure can be rapidly decreased, the engine stall can be prevented and the traveling speed can be increased in the case where the load is applied, and due to the second characteristic line portion set so that the travel primary side pressure can be decreased slowly in comparison with the first characteristic line portion, an effect that easily recovers the engine speed after widely dropping due to the applying of an excessive load can be obtained.

According to a fifth aspect of the present invention, in the first aspect of the present invention, an acceleration operating member for increasing and dropping a target engine speed is comprised, and the drop characteristic line is generated for each of the target engine speeds determined by the acceleration operating member.

According to the fifth aspect of the present invention, the characteristic line rapidly decreasing the travel primary side pressure at the applying of the predefined or more load can be generated for each of the target engine speeds determined by the accelerator operating member can be generated.

According to a sixth aspect of the present invention, in the second aspect of the present invention, an acceleration operating member for increasing and dropping a target engine speed is comprised, and the drop characteristic line is generated for each of the target engine speeds determined by the acceleration operating member.

According to the sixth aspect of the present invention, the characteristic line rapidly decreasing the travel primary side pressure at the applying of the predefined or more load can be generated for each of the target engine speeds determined by the accelerator operating member can be generated.

According to a seventh aspect of the present invention, in the fourth aspect of the present invention, an acceleration operating member for increasing and dropping a target engine speed is comprised, and the drop characteristic line is generated for each of the target engine speeds determined by the acceleration operating member.

According to the seventh aspect of the present invention, the characteristic line rapidly decreasing the travel primary side pressure at the applying of the predefined or more load can be generated for each of the target engine speeds determined by the accelerator operating member can be generated.

According to an eighth aspect of the present invention, in the first aspect of the present invention, the no-load characteristic line is generated so that the travel primary side pressure is gradually decreased as the real engine speed is dropped from the maximum speed at which the acceleration operating member is operated at a maximum to an idling speed, and the drop characteristic line includes a characteristic line portion generated so that the travel primary side pressure is rapidly decreased in comparison with the no-load characteristic line as the real engine speed is dropped under a condition where a predefined load or more is applied.

According to the eighth aspect of the present invention, since the travel primary side pressure under the unloaded condition can be held high to some extent, the traveling speed at the idling can be increased, and when the predefined load or more is applied, the traveling speed at the working can be increased on purpose, preventing the engine stall by rapidly decreasing the travel primary side pressure.

According to a ninth aspect of the present invention, in the eighth aspect of the present invention, the drop characteristic line is bent in a middle portion and includes: the characteristic line portion generated so that the travel primary side pressure is rapidly decreased as the real engine speed can be dropped under the condition where the predefined load or more is applied; and another characteristic line portion generated so that the travel primary side pressure can be decreased slowly in comparison with the characteristic line portion as the real engine speed is dropped, in a case where the engine speed is further dropped.

According to the ninth aspect of the present invention, due to the characteristic line portion set so that the travel primary side pressure can be rapidly decreased, the engine stall can be prevented and the traveling speed can be increased in the case where the load is applied, and due to another characteristic line portion set so that the travel primary side pressure can be decreased slowly in comparison with the characteristic line portion, an effect that easily recovers the engine speed after widely dropping due to the applying of an excessive load can be obtained.

According to a tenth aspect of the present invention, in the third aspect of the present invention, the drop characteristic line is set so that the travel primary side pressure can be decreased as the real engine speed is dropped from the target engine speed, in operation of the acceleration operating member, a speed of switching from the drop characteristic line before the operation of the acceleration operating member to the drop characteristic line after the operation of the acceleration operating member is delayed in accordance with a response delay of the engine speed with respect to the operation of the acceleration operating member.

According to the tenth aspect of the present invention, a natural feeling of the accelerator operation can be obtained by delaying the speed of switching of the drop characteristic line in accordance with the response delay of the engine speed to the operation of the accelerator operating member.

According to an eleventh aspect of the present invention, in the fifth aspect of the present invention, the drop characteristic line is set so that the travel primary side pressure can be decreased as the real engine speed is dropped from the target engine speed, in operation of the acceleration operating member, a speed of switching from the drop characteristic line before the operation of the acceleration operating member to the drop characteristic line after the operation of the acceleration operating member is delayed in accordance with a response delay of the engine speed with respect to the operation of the acceleration operating member.

According to the eleventh aspect of the present invention, a natural feeling of the accelerator operation can be obtained by delaying the speed of switching of the drop characteristic line in accordance with the response delay of the engine speed to the operation of the accelerator operating member.

According to a twelfth aspect of the present invention, in the sixth aspect of the present invention, in operation of the acceleration operating member, a speed of switching from the drop characteristic line before the operation of the acceleration operating member to the drop characteristic line after the operation of the acceleration operating member is delayed in accordance with a response delay of the engine speed with respect to the operation of the acceleration operating member.

According to the twelfth aspect of the present invention, a natural feeling of the accelerator operation can be obtained by delaying the speed of switching of the drop characteristic line in accordance with the response delay of the engine speed to the operation of the accelerator operating member.

According to a thirteenth aspect of the present invention, in the seventh aspect of the present invention, in operation of the acceleration operating member, a speed of switching from the drop characteristic line before the operation of the acceleration operating member to the drop characteristic line after the operation of the acceleration operating member is delayed in accordance with a response delay of the engine speed with respect to the operation of the acceleration operating member.

According to the thirteenth aspect of the present invention, a natural feeling of the accelerator operation can be obtained by delaying the speed of switching of the drop characteristic line in accordance with the response delay of the engine speed to the operation of the accelerator operating member.

According to a fourteenth aspect of the present invention, in the tenth aspect of the present invention, a speed of switching of the drop characteristic line of a case where the acceleration operating member is operated to drop the engine speed is set to be faster than a speed of switching of the drop characteristic line of a case where the acceleration operating member is operated to increase the engine speed.

According to the fourteenth aspect of the present invention, a further natural feeling of the accelerator operation can be obtained by setting the speed of switching of the drop characteristic line of the case where the engine speed is dropped to be fast with respect to the speed of switching of the drop characteristic line of the case where the engine speed is increased.

According to a fifteenth aspect of the present invention, in the eleventh aspect of the present invention, a speed of switching of the drop characteristic line of a case where the acceleration operating member is operated to drop the engine speed is set to be faster than a speed of switching of the drop characteristic line of a case where the acceleration operating member is operated to increase the engine speed.

According to the fifteenth aspect of the present invention, a further natural feeling of the accelerator operation can be obtained by setting the speed of switching of the drop characteristic line of the case where the engine speed is dropped to be fast with respect to the speed of switching of the drop characteristic line of the case where the engine speed is increased.

According to a sixteenth aspect of the present invention, in the twelfth aspect of the present invention, a speed of switching of the drop characteristic line of a case where the acceleration operating member is operated to drop the engine speed is set to be faster than a speed of switching of the drop characteristic line of a case where the acceleration operating member is operated to increase the engine speed.

According to the sixteenth aspect of the present invention, a further natural feeling of the accelerator operation can be obtained by setting the speed of switching of the drop characteristic line of the case where the engine speed is dropped to be fast with respect to the speed of switching of the drop characteristic line of the case where the engine speed is increased.

According to a seventeenth aspect of the present invention, in the thirteenth aspect of the present invention, a speed of switching of the drop characteristic line of a case where the acceleration operating member is operated to drop the engine speed is set to be faster than a speed of switching of the drop characteristic line of a case where the acceleration operating member is operated to increase the engine speed.

According to the seventeenth aspect of the present invention, a further natural feeling of the accelerator operation can be obtained by setting the speed of switching of the drop characteristic line of the case where the engine speed is dropped to be fast with respect to the speed of switching of the drop characteristic line of the case where the engine speed is increased.

According to an eighteenth aspect of the present invention, in the second aspect of the present invention, the travel primary side pressure at a bent portion of the drop characteristic line is a pressure enabling the traveling even at an idling speed.

According to the eighteenth aspect of the present invention, the prevention of the engine stall, the increasing of the traveling speed, and the recovering effect of the engine speed after the engine speed was widely dropped can be achieved well.

According to a nineteenth aspect of the present invention, in the fourth aspect of the present invention, the travel primary side pressure at a bent portion of the drop characteristic line is a pressure enabling the traveling even at an idling speed.

According to the nineteenth aspect of the present invention, the prevention of the engine stall, the increasing of the traveling speed, and the recovering effect of the engine speed after the engine speed was widely dropped can be achieved well.

DESCRIPTION OF EMBODIMENTS

Referring to drawings, an embodiment of the present invention will be explained below.

Figure 1:
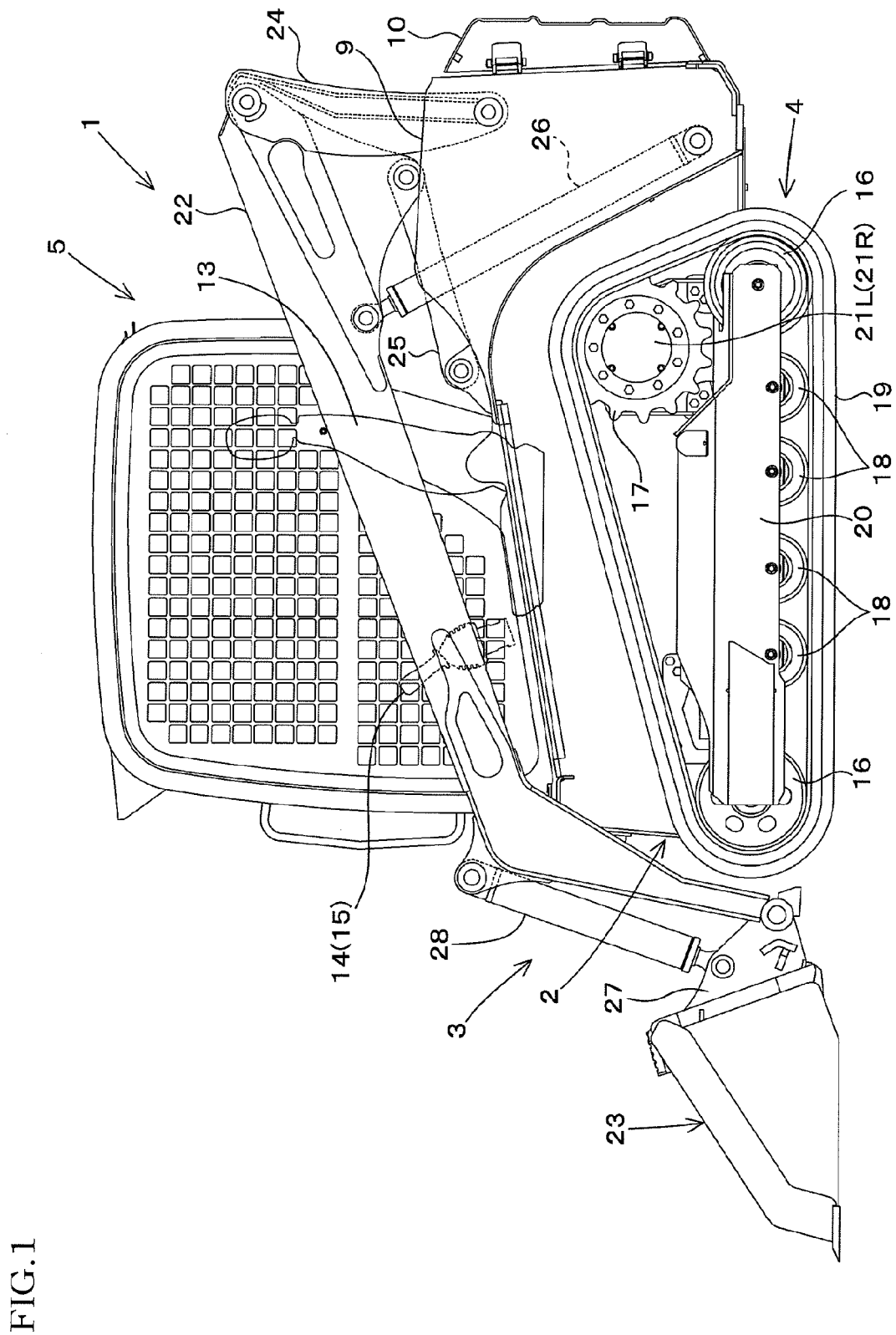
FIG. 1 is an entire side view of a track loader.
Figure 2:
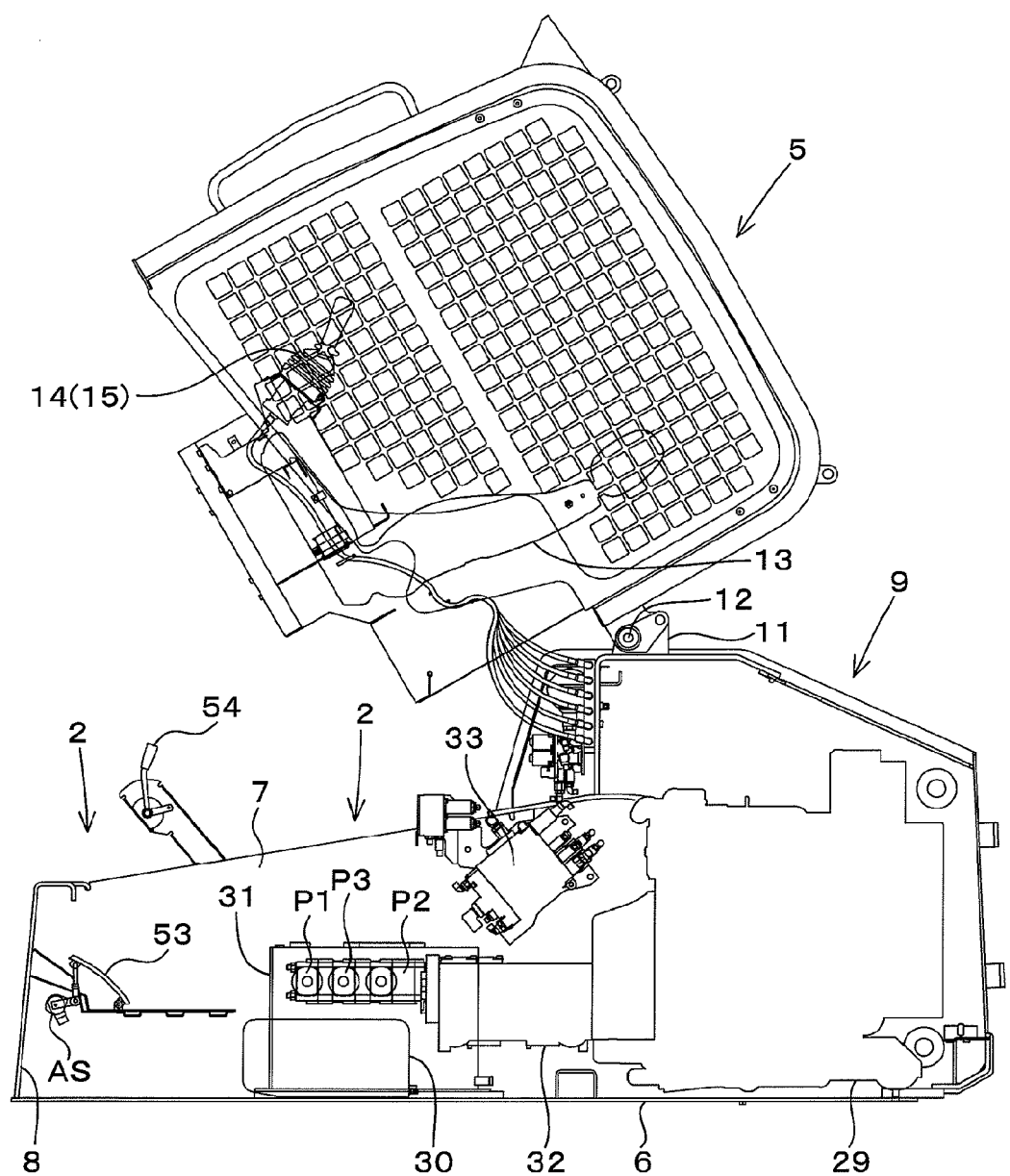
FIG. 2 is a side view showing a part of the track loader under a state where a cabin is lifted.

In FIG. 1 and FIG. 2, a reference numeral 1 is a track loader exemplified as a working machine according to the present invention, the track loader 1 includes: a machine body 2; a working device 3 attached to the machine body 2; and a right-and-left pair of traveling devices 4 for supporting the machine body 2 to be able to travel, and a cabin 5 (an operator protection device) is mounted near an upper front portion of the machine body 2.

The machine body 2 includes: a bottom wall 6; a right-and-left pair of side walls 7; a front wall 8; and a support frame body 9 provided to a rear portion of each of the right and left side walls 7, a space between the side walls 7 is opened upward, and a cover member 10 for covering a rear end opening between the right-and-left pair of support frame body 9 is provided to a rear end portion of the machine body 2 so as to be freely opened and closed.

In the cabin 5, a front lower end of the cabin 5 is mounted on an upper end of the front wall 8 of the machine body 2, and an up-and-down intermediate portion of a back surface of the cabin 5 is supported to a support bracket 11 provided to the machine body 2 so as to freely swing around a support axis 12 in the right and left directions, and when the cabin 5 is swung upward around the support axis 12, the inside of the machine body 2 can be maintained.

An operator's seat 13 is provided in the cabin 5, a traveling operation device 14 for operating the traveling device 4 is arranged on one side of the right and left sides (for example, the left side) of the operator's seat 13, and a working operation device 15 for operating the working device 3 is arranged on the other side of the right and left sides (for example, the right side) of the operator's seat 13.

In the cabin 5, the upper surface of is covered with a roof, the right and left side surfaces is covered with side walls forming many square holes, the upper portion of the back surface is covered with a rear glass, a center portion in a front-rear direction of the bottom surface is covered with the bottom wall, the cabin 5 is formed to be a box shape having an opening toward a front direction, and a platform is provided on the front surface side.

Each of the right and left traveling devices 4 is composed of a crawler traveling device including: a front-and-rear pair of driven wheels 16; a driving wheel 17 arranged near an upper and rear portion between the front and rear driven wheels 16; a plurality of rolling wheels 18 arranged between the front and rear driven wheels 16; and endless-beltlike crawler belts 19 cover the front-and-rear pair of driven wheels 16, the driving wheels 17, and the rolling wheels 18 entirely.

The front-and-rear driven wheels 16 and the rolling wheels 18 are rotatably attached around a horizontal axis to a track frame 20 attached and fixed to the machine body 2, the driving wheels 17 are attached to rotation drums of hydraulically driven traveling motors 21L and 21R (wheel motors) installed to the track frame 20, the crawler belt 19 cyclically travels in a circumferential direction by rotatably driving the driving wheel 17 around the right-and-left axis with use of the traveling motors 21L and 21R, and thereby the track loader 1 is configured to travel forward and backward.

The working device 3 has: a right-and-left pair of arms 22; and a bucket 23 (a working tool) attached to a leading end side of the arm 22.

The arms 22 are each arranged to both of the right side and the left side of the cabin 5, and the right and left arms 22 are coupled by a coupler each other in an intermediate portion on the front portion side.

In each of the right and left arms 22, the base portion side (the rear portion side) is supported to freely swing upward and downward in the upper rear portion of the machine body 2 via a first lift link 24 and a second lift link 25 so that the leading end side of the arm 22 can be lifted up and lowered down on the front side of the machine body 2.

In addition, a lift cylinder 26 configured by a double acting type hydraulic cylinder is provided between: the base portion side of each of the right and left arms 22; and the lower rear portion of the machine body 2, and the right and left arms 22 are swung upward and downward by extending and shortening the right and left lift cylinders 26 simultaneously.

To the leading end side of each of the right and left arms 22, an attachment bracket 27 is coupled with use of a pivot rotatably around the right-and-left axis, and the back surface side of the bucket 23 is attached to the right and left attachment bracket 27.

A bucket cylinder 28 configured by a double acting type hydraulic cylinder is attached between the attachment bracket 27 and the intermediate portion on the leading end side of the arm 22, and thus a configuration where a swing movement (a shoveling operation and a dumping operation) of the bucket 23 is realized by extending and shortening the bucket cylinder 28 is achieved.

The bucket 23 can be freely attached to and detached from the attachment bracket 27, and is configured so as to perform various types of operations other than the digging (or another digging operation) due to attachment of various types of hydraulic attachments (a hydraulically-driven working tools) to the attachment bracket 27 after detachment of the bucket 23.

An engine 29 is provided to the rear side on the bottom wall 6 of the machine body 2, and a fuel tank 30 and a hydraulic oil tank 31 are provided to the front side on the bottom wall 6 of the machine body 2.

A hydraulically driving device 32 for driving the right and left traveling motors 21L and 21R is provided in front of the engine 29, first to third pumps P1, P2, and P3 are provided in front of the hydraulically driving device 32, and a working device control valve 33 (a hydraulic control device) is provided to an intermediate portion in the front-rear direction of a right side wall 7 of the machine body 2.

In the front portion of the machine body 2, an accelerator pedal 53 (an acceleration operating member) for increasing and dropping operations of the engine speed of the engine 29 through a foot operation, and an accelerator lever 54 (the acceleration operating member) for increasing and dropping operations of the engine speed of the engine 29 through a hand operation are provided.

The accelerator lever 54 is linked and engaged to the accelerator pedal 53 via a cable and the like, and when the accelerator lever 54 is operated, the accelerator pedal 53 is operated to swing in synchronization with the operation. In addition, the accelerator lever 54 can be held due to a frictional force at a position where the accelerator lever 54 is moved to. Moreover, the accelerator pedal 53 can be pressed by a foot from the position where the accelerator pedal 53 is moved by the accelerator lever 54, and when the foot-pressing is released, is returned to an initial position previous to the pressing due to a return spring.

An accelerator sensor AS for detecting a pressing amount (an accelerator operation amount) of the accelerator pedal 53 is provided to a lower direction side of the accelerator pedal 53.

Next, referring to FIG. 3 to FIG. 5, the hydraulic system of the track loader 1 will be explained.

The first to third pumps P1, P2, and P3 are each configured by a constant volume type gear pump driven by a driving force of the engine 29.

The first pump P1 (a main pump) is used for driving a hydraulic actuator of the attachment attached to the leading end side of the lift cylinder 26, the bucket cylinder 28 or the arm 22.

The second pump P2 (a pilot pump or a charge pump) is mainly used for supply of a control signal pressure (a pilot pressure).

The third pump P3 (a sub pump) is used for increasing a flow volume of the hydraulic oil supplied to a hydraulic actuator in a case where the hydraulic actuator of the hydraulic attachment attached to the leading end side of the arm 22 is a hydraulic actuator requiring a large capacity.

A discharge oil passage q for flowing the discharge oil discharged from the first pump P1 is connected to a discharge port of the first pump P1, a discharge oil passage a for flowing the discharge oil (the pilot oil) discharged from the second pump P2 is connected to a discharge port of the second pump P2, and a discharge oil passage k for flowing the discharge oil discharged from the third pump P3 is connected to a discharge port of the third pump P3.

In addition, first to sixth supply passage b to g are branched from the discharge oil passage a of the second pump P2, a termination of the discharge oil passage a of the second pump P2 is connected to a seventh supply passage w, a relief valve 52 for setting the maximum pressure of the second pump P2 is connected to a downstream side of a fifth supply passage f.

Figure 3:
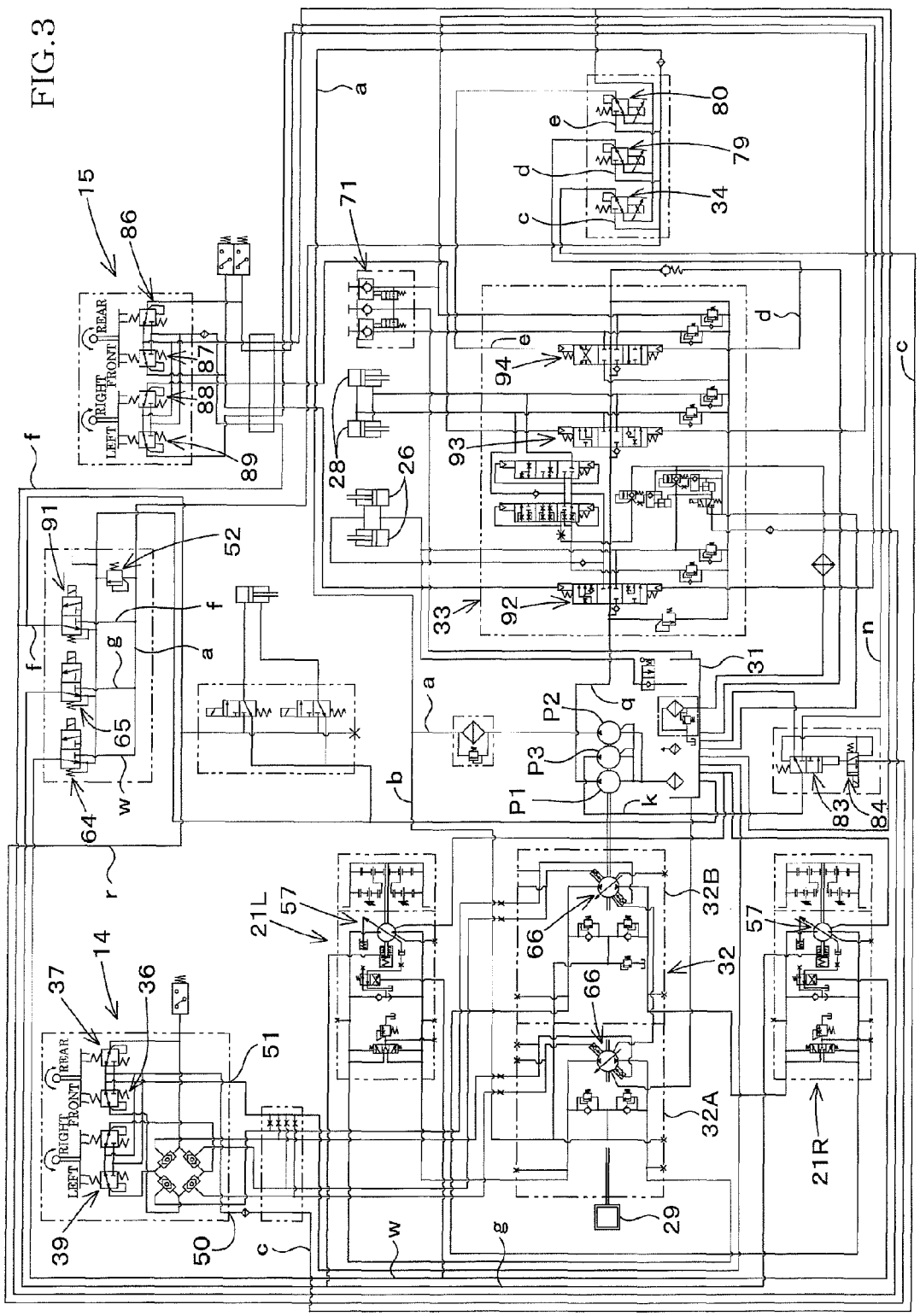
FIG. 3 shows a hydraulic circuit of a hydraulic system of the track loader.
Figure 4:
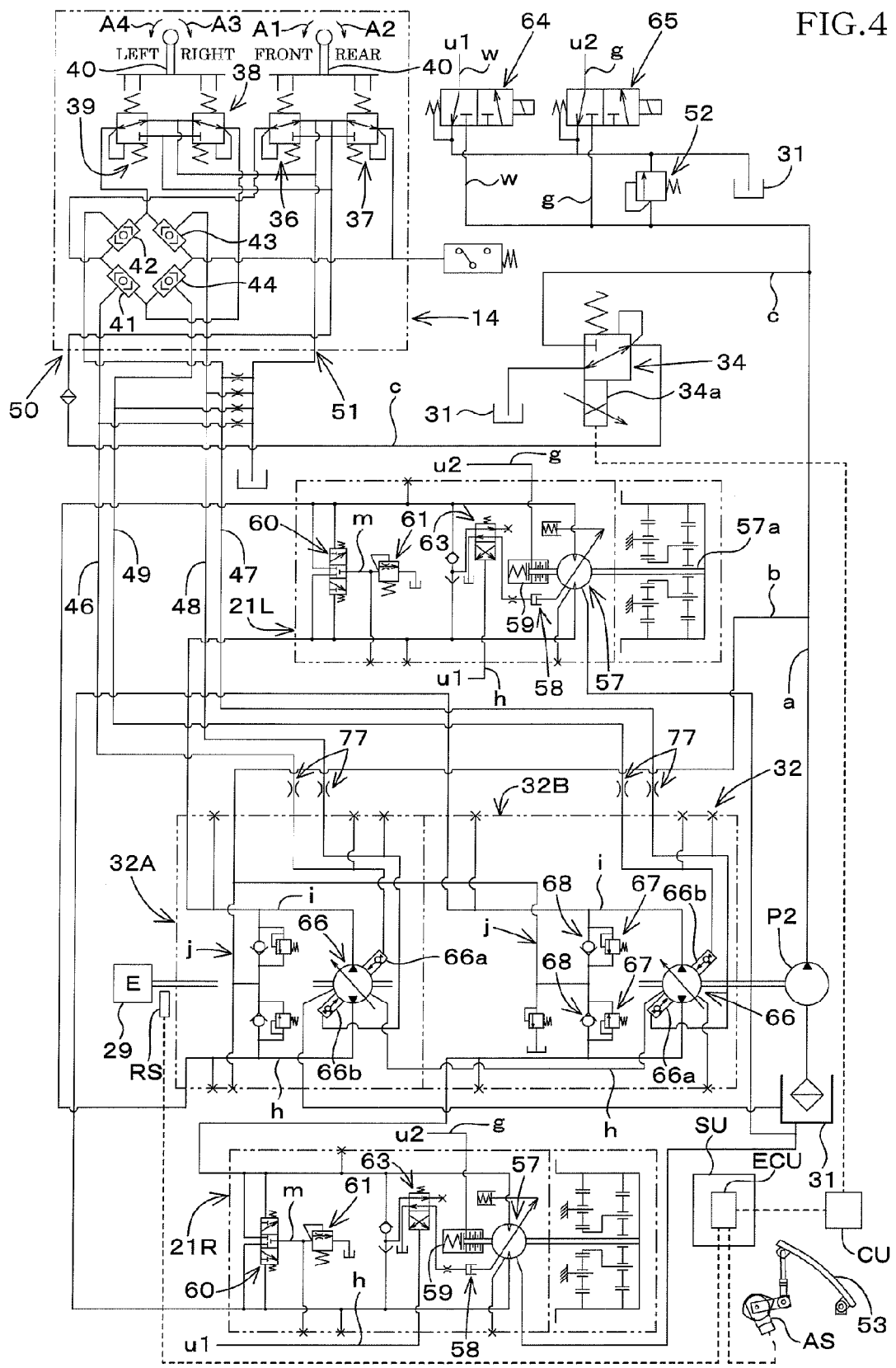
FIG. 4 shows a hydraulic circuit of a traveling system.
Figure 5:
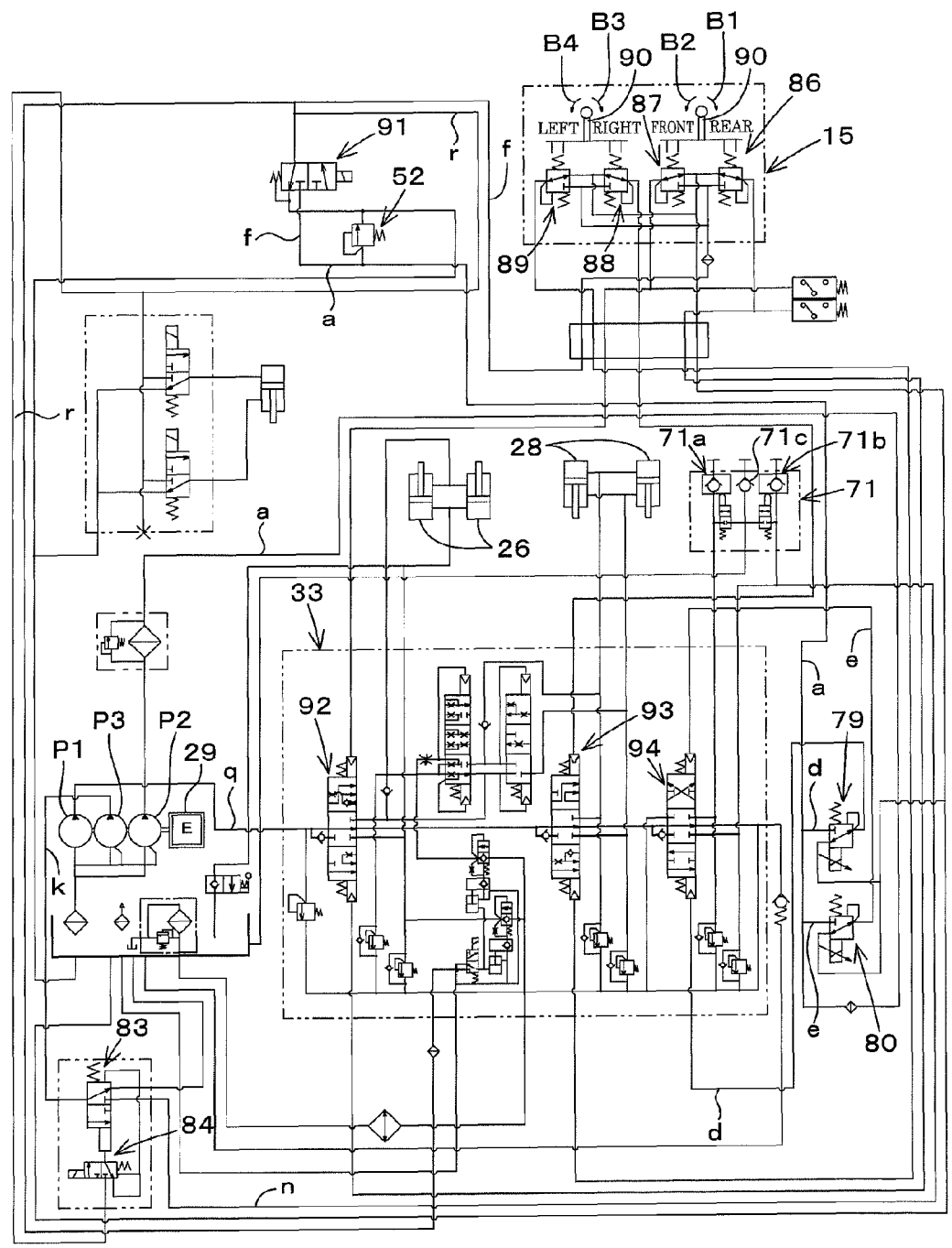
FIG. 5 shows a hydraulic circuit of a working system.

Referring to FIG. 3 and FIG. 5, the hydraulic system of a working system will be explained first.

The working operation device 15 has: an arm lifting pilot valve 86; an arm lowering pilot valve 87; a bucket dumping pilot valve 88; a bucket shoveling pilot valve 89; and a common (one) operation lever 90 for these pilot valves 86, 87, 88, and 89.

The fifth supply passage f is connected to the working operation device 15, a working lock valve 91 composed of a solenoid two-position switching valve is provided to the fifth supply passage, and when the working lock valve 91 is magnetized, the discharge oil of the second pump P2 can be supplied via the fifth supply passage f to each of the pilot valves 86, 87, 88 and 89. Additionally, when the working lock valve 91 is demagnetized, a pressured oil from the second pump P2 cannot be supplied to each of the pilot valves 86, 87, 88 and 89, and thereby the working operation device 15 becomes unable to be operated.

The working device control valve 33 has: an arm control valve 92 for controlling the lift cylinder 26; a bucket control valve 93 for controlling the bucket cylinder 28; and an SP control valve 94 for controlling the hydraulic actuator of the attachment attached to the leading end side and the like of the arm 22, and each of the control valves 92, 93 and 94 are composed of a direct operated spool type three-position switching valve of a pilot system.

The arm control valve 92, the bucket control valve 93 and the SP control valve 94 are connected to the discharge oil passage q of the first pump P1 so as to configure a series circuit, and the discharge oil of the first pump 91 can be supplied to the lift cylinder 26, the bucket cylinder 28 or the hydraulic actuator of the attachment, respectively.

The operation lever 90 of the working operation device 15 can be tilted from a neutral position to front, rear, left and right positions and to inclined positions each between two of the front, rear, left and right positions, and when the operation lever 90 is tilted, the respective pilot valves 86, 87, 88 and 89 of the working operation device 15 are operated to output, from the operated pilot valves 86, 87, 88 and 89, the pilot pressure proportional to the operated amount from the neutral position of the operation lever 90.

In the present embodiment, when the operation lever 90 is tilted to the rear side (an arrowed B1 direction in FIG. 5), the arm lifting pilot valve 86 is operated to operate the arm control valve 92 toward a direction where the lift cylinder 26 is extended, and the arm 22 is lifted at a speed proportional to the tilting amount of the operation lever 90.

When the operation lever 90 is tilted to the front side (an arrowed B2 direction in FIG. 5), the arm lowering pilot valve 87 is operated to operate the arm control valve 92 toward a direction where the lift cylinder 26 is shortened, and the arm 22 is lowered at a speed proportional to the tilting amount of the operation lever 90.

When the operation lever 90 is tilted to the right side (an arrowed B3 direction in FIG. 5), the bucket dumping pilot valve 88 is operated to operate the bucket control valve 93 toward a direction where the bucket cylinder 28 is extended, and the bucket 23 is dumped at a speed proportional to the tilting amount of the operation lever 90.

When the operation lever 90 is tilted to the left side (an arrowed B4 direction in FIG. 5), the bucket dumping pilot valve 89 is operated to operate the bucket control valve 93 toward a direction where the bucket cylinder 28 is shortened, and the bucket 23 is shoveled at a speed proportional to the tilting amount of the operation lever 90.

In addition, when the operation lever 90 is tilted to the inclined position, a combined movement of: the lifting or lowering movement of the arm 22 and the shoveling or dumping movement of the bucket 23 can be operated.

To the SP control valve 94, a pair of pressured oil supply-discharge couplers 71a and 71b of a coupler unit 71 for connecting a hydraulic hose is connected via the hydraulic pipe passage, the hydraulic actuator of the attachment is connected to the couplers 71a and 71b via the hydraulic hose, and thereby the attachment can be operated by the SP control valve 94.

Meanwhile, a drain coupler 71c is included in the coupler unit 71.

The SP control valve 94 can be operated by a pair of SP operation valves 79 and 80 each composed of a proportional solenoid pilot valve, and the SP operation valves 79 and 80 are can be operated by a slide button provided to a top portion side of the operation lever 90 of the working operation device 15.

The SP operation valves 79, one, provided to a fourth supply passage d, the fourth supply passage d is connected to a pressure reception part on one side of the SP control valve 94, and the SP operation valves 80, the other one, is provided to a fifth supply passage e, the fifth supply passage e is connected to a pressure reception part on the other side of the SP control valve 94.

When the slide button provided to the operation lever 90 is slid toward one side, an operation signal is inputted to a control unit CU, a command signal is outputted from the control unit CU to the SP operation valve 79, and thus a pilot pressure proportional to the operation amount is outputted from the SP operation valve 79, one, to the pressure reception part of the one side of the SP control valve 94.

Then, when the slide button is slid toward the other side, the command signal is outputted from the control unit CU to the SP operation valve 80, the other one, and thus a pilot pressure proportional to the operation amount is outputted from the SP operation valve 80, the other one, to the pressure reception part of the one side of the SP control valve 94.

The discharge oil passage k of the third pump P3 is connected to a high flow valve 83.

The high flow valve 83 is composed of a pilot two-position switching valve, can be freely switched between: a non-increasing position where the discharge oil of the third pump P3 is returned to the hydraulic oil tank 31, and an increasing position where the discharge oil of the third pump P3 is supplied to the coupler 71b, one, via an increasing oil passage, is biased by a spring to a direction where being switched to the non-increasing position, and is switched to the increasing position by the pilot pressure applied to the pressure reception part.

A switching valve 84 composed of the solenoid two-position switching valve realizes whether or not the pilot pressure is applied to the pressure reception part of the high flow valve 83, a pilot pressure of a eighth supply passage r branched from the fifth supply passage f is applied to the pressure reception part of the high flow valve 83 by magnetizing the switching valve 84, and the pilot pressure is not applied to the pressure reception part of the high flow valve 83 by demagnetizing the switching valve 84.

Next, referring to FIG. 3 and FIG. 4, a hydraulic system of a traveling system will be explained.

The traveling operation device 14 has: a pilot valve 36 for the forward movement; a pilot valve 37 for backward movement; a pilot valve 38 for the clockwise turning; a pilot valve 39 for the counter-clockwise turning; a common (one) traveling lever 40 for the pilot valves 36, 37, 38 and 39; first to fourth shuttle valves 41, 42, 43 and 44; a pump port 50 for inputting the pressured oil from the second pump P2; and a tank port 51 communicating with the hydraulic oil tank 31.

A second supply passage c is connected to the pump port 50 of the traveling operation device 14, the discharge oil of the second pump P2 is supplied as the pilot oil to the traveling operation device 14, the pilot oil supplied to the traveling operation device 14 can be supplied to a primary side port of each of the pilot valves 36, 37, 38 and 39 of the traveling operation device 14, and the pilot oil not used is drained from the tank port 51.

Each of the right and left traveling motors 21L and 21R has: an HST motor 57 (a traveling hydraulic motor) composed of a tilted-plate type variable capacity axial motor able to change speed in two speeds, high and low; a tilted-plate switching cylinder 58 for changing the speed of the HST motor 57 in two speeds, high and low, by changing an angle of the tilted-plate of the HST motor 57; a brake cylinder 59 for braking an output axis 57a of the HST motor 57 (the output axis 57a of the traveling motors 21L and 21R); a flushing valve 60; and a flushing relief valve 61.

The seventh supply passage w is connected to the tilted-plate switching cylinder 58, then in a case where the pilot oil of the seventh supply passage w is not supplied to the tilted-plate switching cylinder 58, the HST motor 57 is in a first speed, and in a case where the pilot oil of the seventh supply passage w is supplied to the tilted-plate switching cylinder 58, the HST motor 57 is switched to be in a second speed.

The cylinder switching valve 63 composed of the pilot two-position switching valve realizes whether or not the pressured oil is supplied to the tilted-plate switching cylinder 58, and the cylinder switching valve 63 is switched by a two-speed switching valve 64 composed of the solenoid two-position switching valve provided to the seventh supply passage w.

The brake cylinder 59 incorporates a spring for braking the output axis 57a of the HST motor 57 and is connected to a sixth supply passage g, the pilot oil of the sixth supply passage g is supplied to the brake cylinder 59 by magnetizing a brake release valve 65 composed of the solenoid two-position switching valve provided to the sixth supply passage g, and thereby the braking of the output axis 57a of the HST motor 57 is released.

The hydraulically driving device 32 includes: a drive circuit 32A for the left traveling motor 21L (a left drive circuit); and a drive circuit 32B for the right traveling motor 21R (a right drive circuit).

Each of the drive circuits 32A and 33B has: an HST pump (a traveling hydraulic pump) 66 connected to the HST motors 57 of the corresponding traveling motors 21L and 21R so as to configure a closed circuit due to a pair of speed changing oil passages h and i; a high-pressure relief valve 67 for when the pressures of the speed changing oil passages h and i on the high pressure side becomes a set value or more, releasing the pressures to the speed changing oil passages h and i on the low pressure side; and a charging circuit j for charging the pressured oil from the second pump P2 to the speed changing oil passages h and i on the low pressure side via a check valve 68.

The HST pump 66 of each of the drive circuits 32A and 32B is a tilted-plate type variable capacity axial pump driven by a drive force of the engine 29 and also is the pilot hydraulic pump (the tilted-plate type variable capacity hydraulic pump) where the angle of the tilted-plate is changed by the pilot pressure.

Specifically, the HST pump 66 includes a forward-movement pressure reception part 66a and a backward-movement pressure reception part 66b each to which the pilot pressure is applied, changes the angle of the tilted plate due to the pilot pressure applied to the pressure reception parts 66a and 66b to change a discharge direction and a discharge amount of the hydraulic oil, and thereby being configured so that rotation powers of the traveling motors 21L and 21R can be changed in a non-step manner in a direction where the track loader 1 is moved forward (a forward rotation direction) or in a direction where the track loader 1 is moved backward (a backward rotation direction).

The first supply passage b is connected to each of the charging circuits j, and thus the discharge oil of the second pump P2 can be supplied to each of the charging circuits j. In addition, to the right driving circuit 32B, a charge relief valve 78 for setting a circuit pressure of the charging circuits j of the respective driving circuits 32A and 32B is provided.

The flushing valves 60 of the traveling motors 21L and 21R are switched so as to connect the speed changing oil passages h and i on the low pressure side to a flushing relief oil passage m due to the pressures of the speed changing oil passages h and i on the high pressure side, and in order to charge the hydraulic oil to the speed changing oil passages h and i on the high pressure side, releases a part of the hydraulic oil of the speed changing oil passages h and i on the low pressure side to an oil pool in housings of the traveling motors 21L and 21R via the flushing relief oil passage m. The flushing relief valve 61 is installed in the flushing relief oil passage m.

The separated HST (the hydrostatic transmission) is configured by: the HST motors 57, the flushing valves 60 and so on of the traveling motors 21L and 21R; and the driving circuits 32A and 32B and a pair of the speed changing oil passages h and i.

The traveling lever 40 of the traveling operation device 14 can be tilted from a neutral position to front, rear, left and right positions and to inclined positions each between two of the front, rear, left and right positions, and when the traveling lever 40 is tilted, the respective pilot valves 36, 37, 38 and 39 of the traveling operation device 14 are operated to output, from secondary side ports of the operated pilot valves 36, 37, 38 and 89, the pilot pressure proportional to the operated amount from the neutral position of the traveling lever 40.

When the traveling lever 40 is tilted to the front side (an arrowed A1 direction in FIG. 4), the pilot valve 36 for the forward movement is operated to output the pilot pressure from the pilot valve 36, and the pilot pressure is applied from the first shuttle valve 41 to the forward-movement pressure reception part 66a of the HST pump 66 of the left driving circuit 32A via a first flow passage 46, and is applied from the second shuttle valve 42 to the forward-movement pressure reception part 66a of the right driving circuit 32B via a second flow passage. In this manner, the output axes 57a of the right and left traveling motors 21L and 21R rotate forward (the forward rotation) at a speed proportional to a tilting amount of the traveling lever 40, and thus the track loader 1 travels straight in a forward direction.

In addition, when the traveling lever 40 is tilted to the rear side (an arrowed A2 direction in FIG. 4), the pilot valve 37 for the backward movement is operated to output the pilot pressure from the pilot valve 37, and the pilot pressure is applied from the third shuttle valve 43 to the backward-movement pressure reception part 66b of the HST pump 66 of the left driving circuit 32A via a third flow passage 48, and is applied from the fourth shuttle valve 44 to the backward-movement pressure reception part 66b of the HST pump 66 of the right driving circuit 32B via the fourth flow passage.

In this manner, the output axes 57a of the right and left traveling motors 21L and 21R rotate backward (the backward rotation) at a speed proportional to a tilting amount of the traveling lever 40, and thus the track loader 1 travels straight in a backward direction.

Additionally, when the traveling lever 40 is tilted to the right side (an arrowed A3 direction in FIG. 4), the pilot valve 38 for the clockwise turning is operated to output the pilot pressure from the pilot valve 38, and the pilot pressure is applied from the first shuttle valve 41 to the forward-movement pressure reception part 66a of the HST pump 66 of the left driving circuit 32A via the first flow passage 46, and is applied from the fourth shuttle valve 44 to the backward-movement pressure reception part 66b of the HST pump 66 of the right driving circuit 32B via the fourth flow passage 49.

In this manner, the output axis 57a of the left traveling motor 21L rotates forward and the output axis 57a of the right traveling motor 21R rotates backward, and thus the track loader 1 turns in a clockwise direction.

Additionally, when the traveling lever 40 is tilted to the left side (an arrowed A4 direction in FIG. 4), the pilot valve 39 for the counter-clockwise turning is operated to output the pilot pressure from the pilot valve 39, and the pilot pressure is applied from the second shuttle valve 42 to the forward-movement pressure reception part 66a of the HST pump 66 of the right driving circuit 32B via the second flow passage 47, and is applied from the third shuttle valve 43 to the backward-movement pressure reception part 66b of the HST pump 66 of the left driving circuit 32A via the third flow passage 43.

In this manner, the output axis 57a of the right traveling motor 21R rotates forward and the output axis 57a of the left traveling motor 21L rotates backward, and thus the track loader 1 turns in a counter-clockwise direction.

Moreover, when the traveling lever 40 is tilted in the inclined direction, the rotation direction and the rotation speed of the output axes 57a of the traveling motors 21L and 21R are determined on the basis of a differential pressure between the pilot pressures applied to the forward-movement pressure reception part 66a and the backward-movement pressure reception part 66b of the respective driving circuits 32A and 32B, and thus the track loader 1 turns in the clockwise direction or the counter-clockwise direction, traveling forward and backward.

That is, when the traveling lever 40 is tilted to the diagonally forward left side, the track loader 1 turns in the counter-clockwise direction, moving forward at a speed corresponding to a tilt angle of the traveling lever 40, when the traveling lever 40 is tilted to the diagonally forward right side, the track loader 1 turns in the clockwise direction, moving forward at the speed corresponding to a tilt angle of the traveling lever 40, when the traveling lever 40 is tilted to the diagonally backward left side, the track loader 1 turns in the counterclockwise direction, moving backward at the speed corresponding to a tilt angle of the traveling lever 40, and when the traveling lever 40 is tilted to the diagonally backward right side, the track loader 1 turns in the clockwise direction, moving backward at the speed corresponding to a tilt angle of the traveling lever 40.

The first to fourth flow passages 46 to 49 each includes a shock absorbing throttle 77, the supply of the pilot oil from the traveling operation device 14 to the forward-movement pressure reception part 66a and the backward-movement pressure reception part 66b of the HST pump 66 or the returning of the pilot oil from the forward-movement pressure reception part 66a and the backward-movement pressure reception part 66b passes through the shock absorbing throttle 77, and accordingly the machine speed can be prevented from rapidly changing.

With use of the accelerator pedal 53 or the accelerator lever 54, the engine 29 can increase the engine speed from an idling speed (1150 rpm) at which the operated amount of the accelerator members 53 and 54 is zero to the maximum speed (2480 rpm) at which the accelerator members 53 and 54 are operated at the maximum, and when the speed of the engine 29 is increased, the rotation speed of the HST pump 66 increases to increase the discharge amount of the HST pump 66, thereby increasing the traveling speed.

In the present embodiment, a common-rail electronic control fuel supply unit SU is provided, fuel is supplied to the engine 29 by the electronic control fuel supply unit SU. The electronic control fuel supply unit SU has: a common rail composed of a cylindrical tube storing the fuel; a supply pump for highly pressurizing the fuel in the fuel tank 30 and sending the pressurized fuel to the common rail; an injector for injecting the highly-pressurized fuel stored in the common rail to a cylinder of the engine 29; and a controller ECU for controlling a fuel injection amount of the injector.

To the controller ECU, the accelerator sensor AS for detecting an operation amount of the accelerator pedal 53, and a rotation sensor RS for detecting a real rotation speed (a real engine speed) of the engine 29 are connected via a transfer passage, the detection signals of the accelerator sensor AS and the rotation sensor RS are inputted to the controller ECU.

Then, on the basis of the detection signals of the accelerator sensor AS and the rotation sensor RS, the fuel injection amount of the injector is controlled by the controller ECU so that the engine 29 can rotate at a rotation speed (a target engine speed) according to the operation amount of the accelerator pedal 53 or the accelerator lever 54 (determined by the acceleration operating members 53 and 54).

In the second supply passage c, a pressure control valve 34 for control the pilot pressure (the primary side pressure of each of the pilot valves 36, 37, 38 and 39 of the traveling operation device 14) supplied to the traveling operation device 14 is arranged. The pressure control valve 34 is composed of a proportional solenoid valve, and the hydraulic system has the control unit CU for controlling the pressure control valve 34.

A proportional solenoid 34a of the pressure control valve 34 is connected to the control unit CU via the transfer passage, and the secondary side pressure of the pressure control valve 34 (that is, the primary side pressure of each of the pilot valves 36, 37, 38 and 39 of the traveling operation device 14) is controlled by an output current outputted from the control unit CU to the proportional solenoid 34a.

The control unit CU is connected via the transfer passage to the controller ECU of the electronic control fuel supply unit SU, and pieces of information on the target engine speed and the real engine speed are inputted from the electronic control fuel supply unit SU to the control unit CU.

Next, referring to FIG. 6, the control of the primary side pressure (hereinafter, simply referred to as a travel primary side pressure) of each of the pilot valves 36, 37, 38 and 39 of the traveling operation device 14, the control being performed by the control unit CU and the pressure control valve 34, will be explained.

Figure 6:
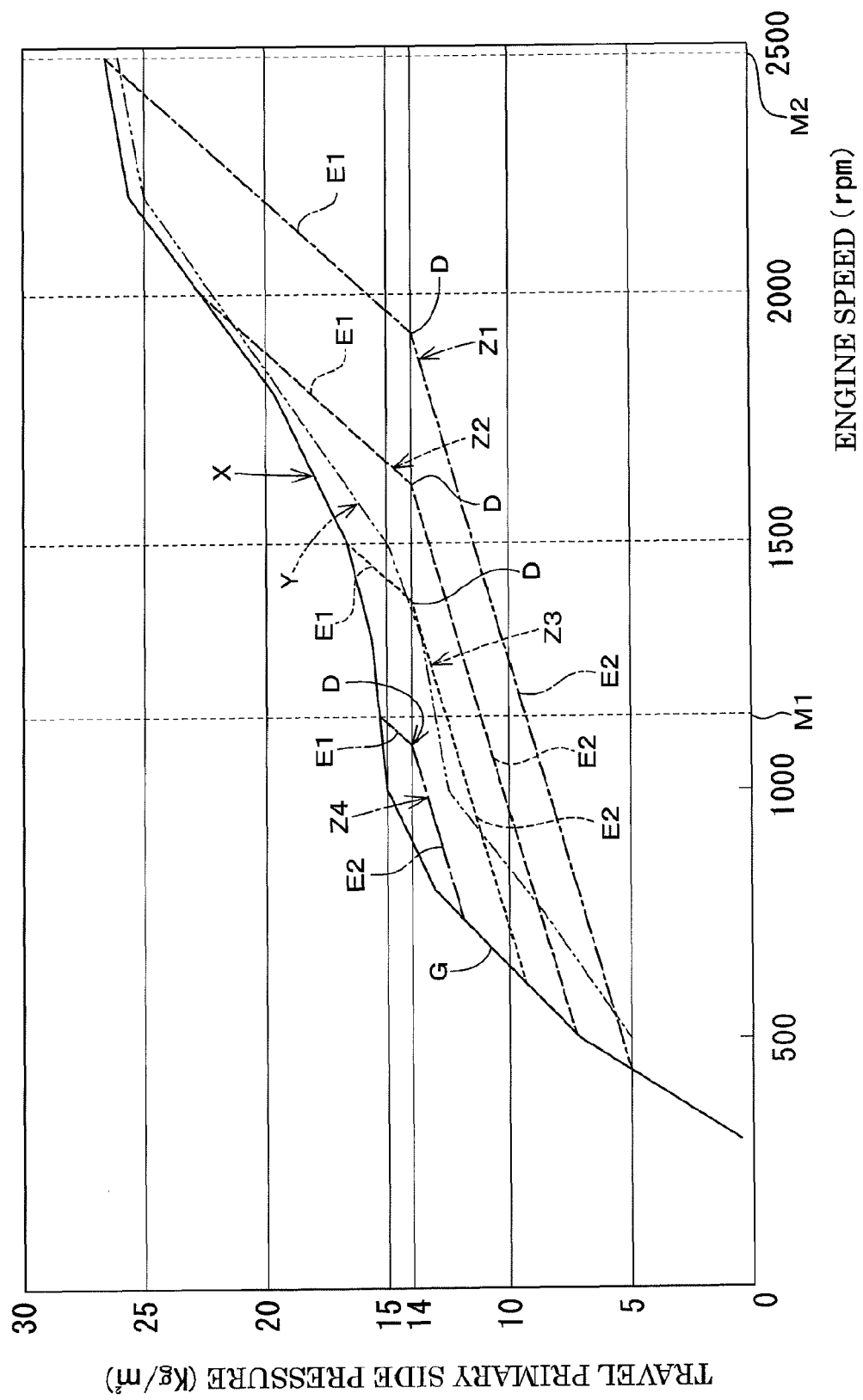
FIG. 6 shows a characteristic view of an engine speed-a travel primary side pressure.

FIG. 6 shows a characteristic diagram showing a relationship between the engine speed and the travel primary side pressure (a pressure characteristic of the travel primary side pressure to the engine speed), a vertical axis indicates the travel primary side pressure, and a horizontal axis indicates the engine speed.

In FIG. 6, M1 shows the idling speed (1150 rpm), and M2 shows the maximum speed (2480 rpm), that is, the target engine speed at which the acceleration operating members (the accelerator member 53 and the accelerator member 54) are operated at the maximum.

A characteristic line X represents a characteristic line showing a relationship between the engine speed of the track loader 1 according to the present embodiment and the travel primary side pressure, and is the characteristic line showing change of the travel primary side pressure with respect to the real engine speed (equal to the target engine speed) at which the engine 29 is unloaded (that is referred to as a no-load characteristic line).

A characteristic line Y represents a characteristic line showing a relationship of the travel primary side pressure with respect to an engine speed of a conventional hydraulic system, and is the characteristic line showing the change of the travel primary side pressure with respect to the real engine speeds at both conditions where the engine is unloaded and where the engine is loaded.

A characteristic line Z represents a characteristic line showing a relationship between the engine speed of the track loader 1 according to the present embodiment and the travel primary side pressure, and is the characteristic line showing the change of the travel primary side pressure with respect to the real engine speed at which a predefined load or more is applied to the engine 29 under a state where the target engine speed is held at a predefined speed by the acceleration operating members 53 and 54, thereby dropping the real engine speed from the target engine speed (that is referred to as a drop characteristic line).

In the track loader 1 according to the present embodiment, the control unit CU and the pressure control valve 34 controls the change of the travel primary side pressure in accordance with the engine speed so that the no-load characteristic line X can be generated when the engine 29 is unloaded and so that the drop characteristic line Z can be generated when the predefined load or more is applied to the engine 29 (Accordingly, when the predefined load or more is applied under the unloaded condition, the no-load characteristic line X is switched to the drop characteristic line Z).

Similar to the conventional characteristic line Y, the no-load characteristic line X is set so that the travel primary side pressure can be gradually decreased as the engine speed is dropped from the maximum speed M2 at which the acceleration operating members 53 and 54 are operated at a maximum to the idling speed M1, and the travel primary side pressure is set to be higher at the same engine speed than that of the conventional characteristic line Y (In FIG. 6, the no-load characteristic line X is positioned above the conventional characteristic line Y).

In addition, the no-load characteristic line X is set so that the travel primary side pressure can be higher at a step than the conventional pressure in the vicinity of the idling speed M1.

A drop characteristic line Z1 shows a characteristic line showing the change of the travel primary side pressure with respect to the real engine speed at which the engine speed is dropped under a condition where the target engine speed is the maximum speed M2, a drop characteristic line Z2 shows a characteristic line showing the change of the travel primary side pressure with respect to the real engine speed at which the engine speed is dropped under a condition where the target engine speed is 2000 rpm, a drop characteristic line Z3 shows a characteristic line showing the change of the travel primary side pressure with respect to the real engine speed at which the engine speed is dropped under a condition where the target engine speed is 1500 rpm, and a drop characteristic line Z4 shows a characteristic line showing the change of the travel primary side pressure with respect to the real engine speed at which the engine speed is dropped under a condition where the target engine speed is the idling speed M1.

The drop characteristic lines Z1 to Z4 illustrated in FIG. 6 exemplify the drop characteristic lines each at which the target engine speed is the maximum speed M2, 2000 rpm, 1500 rpm or the idling speed M1 as a representative, and the drop characteristic line Z exists in each of the target engine speeds from the idling speed M1 to the maximum speed M2.

Accordingly, the drop characteristic line Z exists in a non-step manner from the idling speed M1 to the maximum speed M2, and when the acceleration operating members 53 and 54 are operated, the drop characteristic line Z is controlled to be switched to the drop characteristic line Z corresponding to the target engine speed of the operated position. In addition, the characteristic line Z is continuously changed during the operation of the acceleration operating members 53 and 54 (continuously switched).

Each of the drop characteristic lines Z is bent in the middle portion (the drop characteristic line Z changes a slope of the characteristic line in the middle portion), and has: a first characteristic line portion E1 that is a characteristic line portion in a region on a higher engine speed side than the bent portion D; and a second characteristic line portion E2 that is a characteristic line portion in a region on a lower engine speed side than the bent portion D (another characteristic line portion).

Meanwhile, in the illustrated examples, although the drop characteristic lines Z are bent to form a corner (to be an obtuse angle) at the bent portion D (the bent portion D forms the corner), the drop characteristic lines Z may be bent to be a curved at the bent portion D (the bent portion D may be curved).

The first characteristic line portion E1 is set so that the travel primary side pressure can be rapidly decreased in comparison with the no-load characteristic line X as the real engine speed is dropped from the target engine speed to the bent portion D (a difference between the travel primary side pressure of the first characteristic line portion E1 and the travel primary side pressure of the no-load characteristic line X becomes gradually larger as the real engine speed is dropped.).

The second characteristic line portion E2 is set so that the travel primary side pressure can be decreased slowly in comparison with the first characteristic line portion E1 as the real engine speed is dropped from the bent portion D.

Meanwhile, the first characteristic line portion E1 and the second characteristic line portion E2 of the drop characteristic line Z exemplified in the drawing are straight lines where the slope of the first characteristic line portion E1 is larger than that of the second characteristic line portion E2, however; the first characteristic line portion E1 and the second characteristic line portion E2 may be curved lines approximately along the first characteristic line portion E1 and the second characteristic line portion E2 exemplified in the drawing.

In addition, the drop characteristic line Z may be generated by extending the first characteristic line portion E1 exemplified in the drawing toward the lower side (in this case, the second characteristic line E2 is not provided).

Moreover, in the present embodiment, the drop characteristic line Z1 under a condition where the target engine speed is the maximum speed M2 is experimentally obtained, the drop characteristic line Z1 at the maximum speed M2 is set as a reference drop characteristic line, and then other drop characteristic lines (the drop characteristic lines Z2, Z3 and Z4, and other drop characteristic lines not shown in the drawing) are generated by moving the reference drop characteristic line Z1 in parallel along the horizontal axis. Accordingly, the slopes of the first characteristic line portions E1 of the respective drop characteristic lines Z are the same, the slopes of the second characteristic line portions E2 of the respective drop characteristic lines Z are also the same, and the travel primary side pressures at the bent portions D of the respective drop characteristic lines Z are the same.

In the present embodiment, detection of the load applied to the engine 29 is performed by calculating the difference between the target engine speed and the real engine speed in the control unit CU (when the real engine speed is lower than the target engine speed, it is determined that the load is applied).

Then, when the no-load is applied, the pressure control valve 34 is controlled so that the pressure can be the travel primary side pressure of the real engine speed determined by the characteristic line X, and when the predefined load or more is detected, the pressure control valve 34 is controlled so that the pressure can be the travel primary side pressure of the real engine speed determined by the drop characteristic line Z. That is, the characteristic line of the travel primary side pressure of the real engine speed is switched in each of the cases where the no-load is applied and where the predefined load or more is applied.

As described above, the no-load characteristic line X is generated to set the travel primary side pressure of the real engine speed to be higher than the conventional pressure, for example, a traveling speed under a condition where a large load is not applied in a case where the working device 3 is not operated or in a case of the hill-climbing is intended to be higher, especially the travel primary side pressure is set to be higher by a step than the conventional pressure in comparison with a high engine speed range in the vicinity of the idling speed M1, and thereby intending the increasing of the traveling speed at the idling.

In addition, when the predefined load or more is applied to the engine 29, the travel primary side pressure is rapidly (widely) decreased in accordance with the dropping of the real engine speed as shown in the first characteristic line portion E1 of the drop characteristic line Z.

In this manner, the increasing of the traveling speed can be intended by stabilizing the real engine speed to be higher in the dropping of the engine speed, preventing the engine stall.

Specifically, when the travel primary side pressure in the dropping of the engine speed is decreased, the pilot pressure (the travel secondary side pressure) outputted from the traveling operation device 14 is decreased, and thereby the tilted-plate angle of the HST pump 66 is adjusted so as to drop the engine speed (so that the tilted plate can return to a neutral side) to decrease the load applied to the engine 29, thus preventing the engine 29 from stalling.

In addition, when the travel primary side pressure is rapidly decreased in the dropping of the engine speed, the load applied from the HST pump 66 side to the engine 29 is decreased early, and thus when the real engine speed is dropped, for example, in a case where the target engine speed is the maximum speed M2, the real engine speed can be balanced at 2200 rpm higher than 1500 rpm at which the real engine speed is balanced conventionally.

And, since the increasing of the traveling speed due to the increasing of flow of the HST pump 66 caused by the engine speed is larger than the reducing of the traveling speed due to the reducing of flow of the HST pump 66 caused by the reducing of the tilted-plate angle, the higher flow amount of the HST pump 66 can be assured by stabilizing the real engine speed to be higher in the dropping of the engine speed, and thereby the traveling speed can be totally increased. Additionally, when the load applied from the HST pump 66 side to the engine 29 is decreased early, a high torque can be kept.

In this manner, the traveling speed in the operation applying the large load to the engine 29 can be increased, and the traveling speed (a hill-climbing speed), for example, in the hill-climbing operation under a condition where a movable load of the bucket 23 is excessive can be increased.

As described above, in the present embodiment, the travel primary side pressure is electrically controlled by controlling the pressure control valve 34 with use of the control unit CU, and thereby the characteristic line of the travel primary side pressure of the real engine speed can be switched in each of the cases where the no-load is applied and where the predefined load or more is applied. Accordingly, the traveling speed can be increased by setting the travel primary side pressure under the unloaded state to be higher, and under the state where the predefined load or more is applied, the traveling speed can be increased, preventing the engine stall.

Even in a case where the working is operated by setting the target engine speed to the maximum speed M1 due to the accelerator pedal 53 pressed by a foot, the real engine speed is dropped to around 1200 rpm in a case where the bucket 23 is thrust into, for example, the piled earth and sand by moving the track loader 1 forward, however, when the slope of the drop characteristic line Z is large in the dropping of the real engine speed (the decreasing amount of the travel primary side pressure with respect to the dropping amount is large), the torque of the engine 29 runs short, and accordingly the real engine speed is slowly recovered. And, in a case where the track loader tries to move backward after the bucket 23 is thrust into, for example, the piled earth and sand, when the real engine speed is low and also the travel primary side pressure is low, the engine speed is hard to be recovered and thus the track loader cannot move backward smoothly.

Accordingly, in order to easily recover the real engine speed after the engine speed is widely dropped, the slope of the second characteristic line portion E2 that is the region having an excessive dropping amount is set to be moderate more than the slope of the first characteristic line portion E1 by bending the drop characteristic line Z in the middle portion, and the decreasing amount of the travel primary side pressure with respect to the dropping amount is decreased at a highly-loaded state.

In this manner, the real engine speed is easily recovered after the engine speed is excessively and widely dropped, and in a case where the track loader tries to move backward after the bucket 23 is thrust into, for example, the piled earth and sand, the track loader can move backward smoothly.

When the travel primary side pressure at the bent portion D is too high, an effect of the increasing of the traveling speed cannot be obtained in the hill-climbing operation under the above-mentioned condition where the movable load of the bucket is excessive, and when the travel primary side pressure is too low, an effect of the recovering of the real engine speed cannot be obtained after the engine speed is widely dropped. Accordingly, in the present embodiment, the travel primary side pressure at the bent portion D is a pressure (a predefined pressure) at which the track loader can travel even in the idling speed M1, and is specifically set to 14 kg/m$^2$.

That is, the second characteristic line portion E2 having the moderate slope is generated starting from the travel primary side pressure at which the track loader can travel even in the idling speed M1, and thus even if the engine speed is widely dropped, the travel primary side pressure is not widely decreased than the pressure at which the track loader can travel even in the idling speed M1.

Additionally, in the present embodiment, a low speed characteristic line G of a low speed region where the engine speed is less than the idling speed M1 is provided.

The low speed characteristic line G is generated so as to extend from an end portion on the idling speed side of the no-load characteristic line X, and is generated so that the travel primary side pressure can be decreased as the engine speed is dropped.

In addition, the respective drop characteristic lines Z intersect with the low speed characteristic line G, and the low speed characteristic line G is set so that the travel primary side pressure can be widely (rapidly) decreased in the portions intersecting with the respective drop characteristic lines Z as the engine speed is dropped, in comparison with the second characteristic line portion E2.

In the state where the target engine speed is the idling speed M1 (the state where the accelerator members 53 and 54 are not operated), when the predefined load or more is applied in the traveling through the operation of the traveling lever 40, the characteristic line is switched to the drop characteristic line Z4 to control the travel primary side pressure, however, when the travel primary side pressure is high in the low engine speed, the engine is easily stalled.

Accordingly, in order to prevent the engine stall under the condition where the target engine speed is the idling speed M1, when the drop characteristic Z4 intersects with the low speed characteristic line G, the characteristic line is switched to the low speed characteristic line G to control the travel primary side pressure.

In the same manner, also in a case where the travel primary side pressure is controlled by another drop characteristic line Z, when the drop characteristic line Z intersects with the low speed characteristic line G, the characteristic line is switched to the low speed characteristic line G to control the travel primary side pressure.

Additionally, in the present embodiment, as described above, the drop characteristic line Z exists for each of the target engine speeds, and when the accelerator is operated (the accelerator pedal 53 or the accelerator lever 54 is operated), the characteristic line is switched to the drop characteristic line Z corresponding to the target engine speed determined by the accelerator operation. However, since the drop characteristic line Z is continuously changed in the operation of the accelerator, the operation feeling of the accelerating operation will be better.

Moreover, in the accelerating operation, when the characteristic line is instantly switched to the drop characteristic line Z corresponding to the target engine speed after the accelerating operation in accordance with the accelerating operation, an uncomfortable feeling and shock are caused in the operation, and accordingly a switching speed of the drop characteristic line Z is controlled to delay from the accelerating operation (a time lag between the accelerating operation and the switching of the drop characteristic line is provided).

That is, for example, when the real engine speed is dropped to 1000 rpm under a condition where the accelerator is operated so that the target engine speed can be 1500 rpm, in a case where the target engine speed is tried to be increased to 2000 rpm by the accelerating operation, the drop characteristic line is switched from Z3 to Z2. However, on this occasion, there is a response delay (the time lag) of the increasing of the real engine speed corresponding to the accelerating operation, and when the drop characteristic line is instantly switched from Z3 to Z2, the travel primary side pressure is decreased to a pressure at around 1000 rpm of the drop characteristic line Z2 once until the real engine speed is increased. That is, although the engine speed is tried to be increased, a phenomenon that the travel primary side pressure is decreased once is caused, and thus an operator feels the uncomfortable feeling and feels the shock in the operation.

On the contrary, when the real engine speed is dropped to 1000 rpm under a condition where the accelerator is operated so that the target engine speed can be 2000 rpm, in a case where the target engine speed is tried to be dropped to 1500 rpm by the accelerating operation, the phenomenon that the travel primary side pressure is decreased once is caused when the drop characteristic line is instantly switched from Z2 to Z3.

Accordingly, in the present embodiment, the switching speed of the drop characteristic line Z is delayed with respect to the accelerating operation from the accelerating operation so as to be synchronized with the increasing speed or the dropping speed of the engine speed (In other words, in the operation of the accelerator members 53 and 54, the speed of the switching from the drop characteristic line Z before the operation of the accelerator members 53 and 54 to the drop characteristic line Z after the operation of the accelerator members 53 and 54 is delayed in accordance with the response delay of the engine speed with respect to the operation of the accelerator members 53 and 54).

In this manner, the speed of the switching of the drop characteristic line Z in the accelerating operation is matched with the increasing speed or the dropping speed of the engine speed, the traveling speed is smoothly increased or decreased in accordance with the accelerating operation, and accordingly the operation feeling of the accelerator members 53 and 54 will be better.

The speed of the switching of the drop characteristic line Z is experimentally obtained. When the response of the engine speed is substantially slow with respect to the accelerating operation, a time for increasing or a time for dropping the engine speed required, for example, in the accelerating operation under a condition where the track loader climbs a hill with the bucket 23 excessively loaded is counted, and the speed of switching of the drop characteristic line Z is determined in accordance with the counted time.

In the present embodiment, in a case of increasing the engine speed from any target engine speed to any other target engine speed, the speed of the switching of the drop characteristic line Z is constant, and also in a case of dropping the engine speed from any target engine speed to any other target engine speed, the speed of the switching of the drop characteristic line Z is constant.

However, the responsibility of the engine speed is different in both cases of the accelerating operation to increase the engine speed and of the accelerating operation to drop the engine speed, and accordingly the speed of the switching of the drop characteristic line Z is changed in each of the cases of increasing the engine speed and of dropping the engine speed.

Since the load applied to the engine 29 is relatively smaller in the dropping of the engine speed than that in the increasing of the engine speed, the speed of the switching of the drop characteristic line Z in the case where the accelerator members 53 and 54 are operated to drop the engine speed is set to be faster than the speed of the switching of the drop characteristic line Z in the case where the accelerator members 53 and 54 are operated to increase the engine speed.

In addition, in the present embodiment, in a case where the real engine speed is higher than the target engine speed determined by the accelerator members 53 and 54, the pressure is controlled to the travel primary side pressure set by the no-load characteristic line X.

The present invention may employ other self-propelled working machine, for example, a working machine such as a backhoe, having: the traveling device 4 operating with use of the hydraulic motor driven by the discharge oil of the hydraulic pump that is driven by the engine 29; and the working device driven by the discharge oil of the hydraulic pump that is driven by the engine 29.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

The texts of Japanese application Nos. 2011-174991, 2011-174992, and 2011-174993 filed on Aug. 10, 2011 are hereby incorporated by reference.

The invention claimed is:

1. A working machine comprising:
an engine;
a travelling device;
a hydro static transmission (HST) pump composed of a tilted-plate type variable capacity pump driven by the engine;
an HST motor connected to the HST pump and a pair of gear-changing oil passages to form a closed circuit with the HST pump and the pair of gear-changing oil passages, the HST motor being configured to be driven by a discharge oil from the HST pump to drive the travelling device;
a pilot pump driven by the engine;
a travel operation device configured to control a tilted plate of the HST pump due to a pilot oil discharged by the pilot pump;
a pressure control valve configured to control a travel primary side pressure, the travel primary side pressure being a pressure of a primary side of the travel operation device;
an acceleration operating member for increasing and decreasing an engine speed of the engine to determine a target engine speed; and
a control unit configured to control the pressure control valve, the control unit including:
a no-load characteristic line showing a relationship, under a condition where the engine is unloaded, between the travel primary side pressure and a real engine speed that is an actual speed of the engine; and
a drop characteristic line provided for each of the target engine speeds determined by the acceleration operating member, the drop characteristic line showing a relationship, under a condition where a predefined load or more is applied to the engine, between the travel primary side pressure and the real engine speed, and the drop characteristic line including:
- a first characteristic line portion used for decreasing the travel primary side pressure on a basis of a difference between the real engine speed and the target engine speed, the target engine speed being a speed of the engine determined by the acceleration operating member; and
- a second characteristic line portion used for decreasing the travel primary side pressure on a basis of a difference between the real engine speed and the target engine speed and at a rate smaller than a rate for decreasing the travel primary side pressure in the first characteristic line portion, wherein the control unit is configured to control the pressure control valve on a basis of the no-load characteristic line when the engine is unloaded and to control the pressure control valve on a basis of the first characteristic line portion and the second characteristic line portion when a predetermined load or more is applied to the engine.

2. The working machine according to claim 1, wherein, upon an operation of the acceleration operating member, the control unit delays switching from an applied drop characteristic line of the plurality of drop characteristic lines to another drop characteristic line of the plurality of drop characteristic lines in accordance with a response delay of the real engine speed caused upon the operation of the acceleration operating member, the applied drop characteristic line being set before the operation of the acceleration operating member, the another drop characteristic line being provided for the target engine speeds determined by the operation of the acceleration operating member.

3. The working machine according to claim 2, wherein the control unit is configured to provide a first speed for switching from the applied drop characteristic line to the another drop characteristic line when the acceleration operating member is operated to increase the target engine speed, and a second speed for switching from the applied drop characteristic line to the another drop characteristic line when the acceleration operating member is operated to decrease the engine speed, the second speed being higher that the first speed.

4. The working machine according to claim 1, wherein the no-load characteristic line is used for decreasing the travel primary side pressure in synchronization with the real engine speed dropping from a maximum speed to an idling speed, the maximum speed being obtained when the acceleration operating member is operated to a maximum extent.

* * * * *